United States Patent [19]

Downing

[11] Patent Number: 4,595,214
[45] Date of Patent: Jun. 17, 1986

[54] BICYCLE PARKING BRAKE

[75] Inventor: Verlon D. Downing, Centerville, Ohio

[73] Assignee: Raleigh Cycle Company of America, Miamisburg, Ohio

[21] Appl. No.: 605,701

[22] Filed: Apr. 30, 1984

[51] Int. Cl.$^4$ .............................................. B60H 3/04
[52] U.S. Cl. .................. 280/296; 188/24.11; 188/29
[58] Field of Search ............. 280/272, 296, 299, 302, 280/289 R, 289 L; 70/226, 228; 188/24.11, 29, 74

[56] References Cited

U.S. PATENT DOCUMENTS

| | | | |
|---|---|---|---|
| 537,265 | 4/1895 | Bell | 280/296 |
| 554,454 | 2/1896 | McKanna | 280/296 |
| 619,646 | 2/1899 | Ward | 280/296 |
| 4,185,850 | 1/1980 | Levine | 280/296 |

FOREIGN PATENT DOCUMENTS

| | | | |
|---|---|---|---|
| 227484 | 6/1943 | Switzerland | 280/272 |

*Primary Examiner*—John A. Pekar
*Attorney, Agent, or Firm*—Biebel, French & Nauman

[57] ABSTRACT

A readily releasable parking brake for a bicycle includes a housing to be secured to the underside of the down tube of a bicycle frame, and a generally U-shaped spring wire form which has the ends of its leg portions received in a recess in the housing and turned out for pivotal mounting in a pair of aligned holes in the side walls of the housing providing for movement of the wire form through approximately 90° between the back and bottom walls of the recess. Aligned grooves in the side walls of the housing adjacent their junctions with the back and bottom walls of the recess act as keepers for the legs of the wire form, and the head of the screw by which the housing is mounted on a bicycle is proportioned to spread the form legs into interfitting relation with these grooves, so that engagement and disengagement of the spring form with respect to these grooves is with a snap action. In addition, the housing is provided with counterbored through bores which serve as guides for the gear shifter cables and as retainers for the sheaths covering the upper portions of these cables.

6 Claims, 10 Drawing Figures

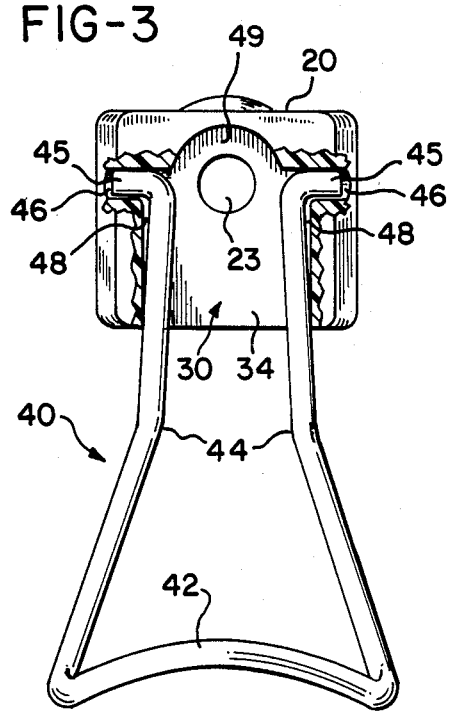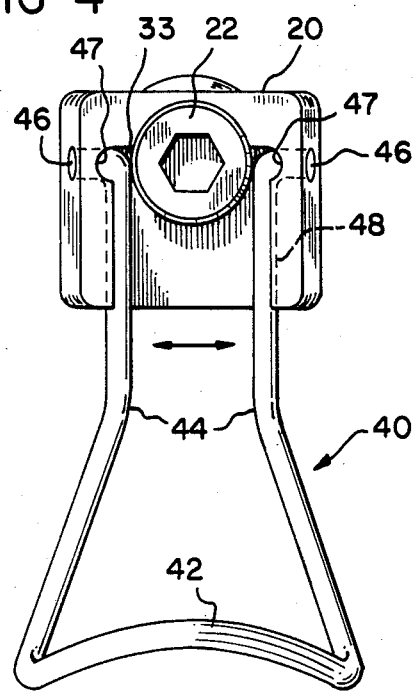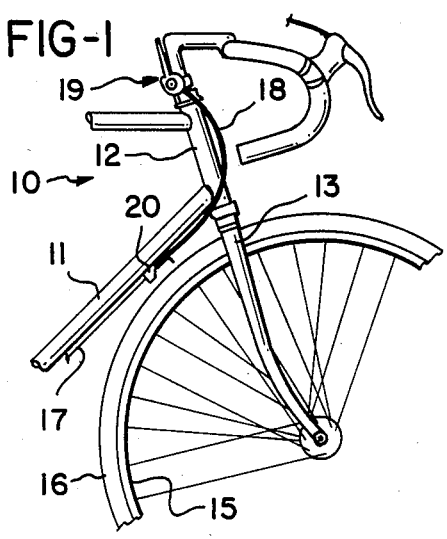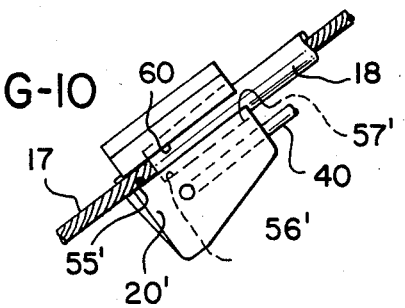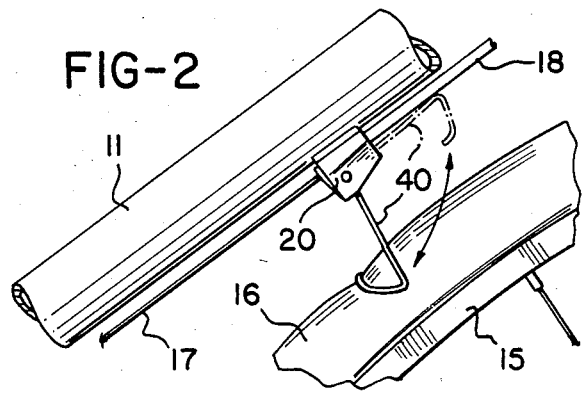

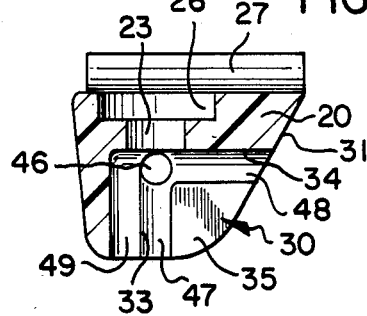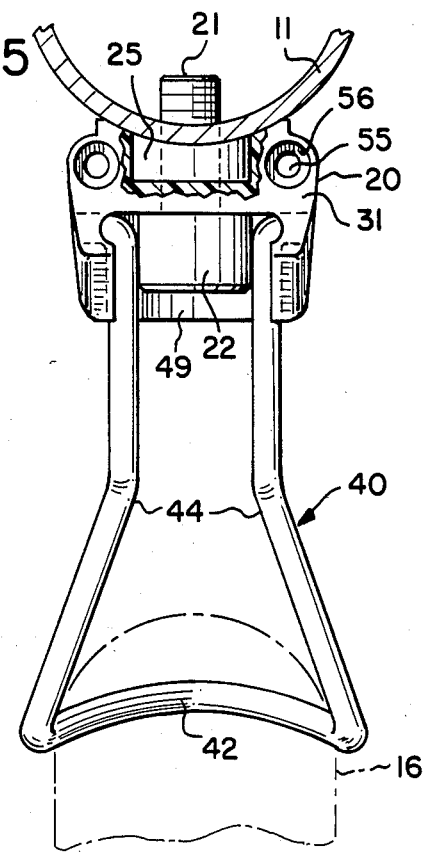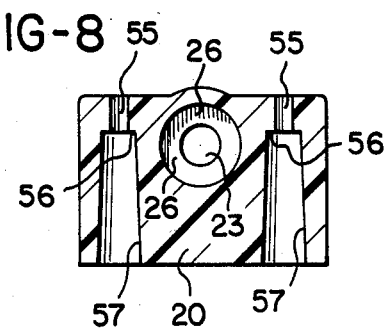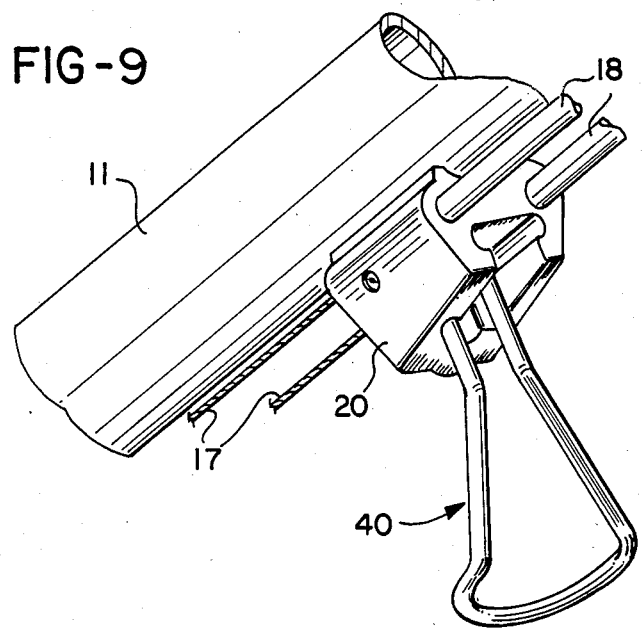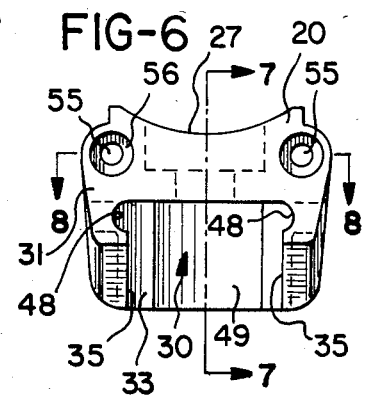

BICYCLE PARKING BRAKE

BACKGROUND OF THE INVENTION

It is a common problem for bicycle riders that when parking the bicycle, either by means of its kickstand or by leaning it against a building, tree or other stationary support, care must be take to arrange the front wheel and handlebars so that the front fork does not spin in the frame head and cause the bike to fall. The present invention has as its primary object the provision of a simple and effective parking brake for releasably holding the front wheel of a bicycle in line with the rest of the frame while the bicycle is parked.

SUMMARY OF THE INVENTION

The invention provides a releasable parking brake in the form of a housing, which may readily be a molded plastic part, secured to the underside of the down tube of a bicycle frame in close proximity to the front wheel tire. A generally U-shaped spring wire form, which has its center portion shaped to fit over the front tire, has its generally parallel leg portions received between the side walls of a generally rectangular recess in the underside of the housing, and these legs have oppositely outwardly turned end portions received in a pair of aligned holes in the side walls of the recess to form a pivotal mounting for the wire form in the housing.

The mounting of the housing on the frame includes a cap screw whose head is located between the end portions of the wire form arms and is proportioned to spread those arms so that when they are at either end of their pivotal movement, they snap with a detent action into a pair of grooves in the side walls of the recess in which the arms are pivotally mounted.

The parking brake of the invention also has a dual function when it is installed on a bicycle whereon the cables which operate the gear shifter from controls on the handlebars have their upper portions sheathed. More specifically, the brake housing has through bores for receiving and guiding these cables, and the forward ends of these through bores have counterbores in which the lower ends of the cable sheaths are seated and retained.

Other objects and advantages of the invention will be apparent from the following description, the accompanying drawings and the appended claims.

BRIEF DESCRIPTION OF THE DRAWINGS

FIG. 1 is a fragmentary side elevation of a bicycle equipped with the parking brake of the invention, with the braking member shown in retracted position;

FIG. 2 is a fragmentary view on a larger scale showing the brake in operating position;

FIG. 3 is an elevational view of the brake in retracted position within its supporting housing prior to mounting on the bicycle;

FIG. 4 is a view similar to FIG. 3 with the mounting screw for the housing in position;

FIG. 5 is a front elevational view, partially broken away, showing the brake mounted on the bicycle and in operating position;

FIG. 6 is a view similar to FIG. 5 showing the housing alone;

FIG. 7 is a section on the line 7—7 of FIG. 6;

FIG. 8 is a section on the line 8—8 of FIG. 6;

FIG. 9 is a fragmentary isometric view showing the brake in operating position on a bicycle, and FIG. 10 is a fragmentary view similar to FIG. 2 and showing a modified form of the brake housing.

DESCRIPTION OF THE PREFERRED EMBODIMENT

The parts of a bicycle frame indicated generally at 10 include a down tube 11 extending downwardly and rearwardly from the head 12 wherein the upper end of the front fork 13, which carries the front wheel 15, is journalled, the front wheel having the usual tire 16. The cables 17 have their upper portions provided with sheaths 18 and extend to the gear changer from the usual operating mechanism 19 mounted on the handlebars, all of these parts being conventional.

The parking brake of the invention comprises a molded plastic housing 20 which is secured on the underside of the down tube 11 by a cap screw 21 having a head 22 and extending through a bore 23 in the housing 20 into a tapped boss 25 which is brazed or otherwise secured to the tube 11 and received in the counterbore 26 at the upper end of the bore 23, the top of housing 20 being curved at 27 to fit the tube 11. A recess 30 in the housing 20 extends from the front end 31 thereof to a back wall 33 which is substantially normal to the down tube 11 and to the bottom wall 34 of the recess, and it has parallel side walls 35 extending from the back wall 33 to the front end 31 of the housing.

The braking member is a generally U-shaped spring wire form 40 which has its center portion 42 curved to engage the front tire 16. The two legs 44 of the form 40 converge from its center portion 42 to a spacing which fits within the recess 30, and the ends 45 of the legs 44 are turned out in opposite directions at approximately right angles to fit into a pair of aligned holes 46 in the side walls 35 adjacent the inner corners of the recess 30 and thereby to provide a pivotal mounting for movement of the form 40 between a retracted positions parallel to the back wall 33 as shown in broken lines in FIG. 2, and an operating position parallel to the bottom wall 34 of recess 30 as shown in full lines in FIG. 2.

A relatively shallow groove 47 extends along each of the side walls 35 adjacent its junction with the back wall 33, and a second similar groove 48 extends along each side wall 35 adjacent its junction with the bottom wall 34. These opposed pairs of grooves 47 and 48 are proportioned to receive the wire form legs 44 therein when the form 40 is at either end of its limits of travel between the recess walls 33 and 34. The back wall 33 also includes a cylindrically curved recess 49 to accommodate the head 22 of mounting screw 21.

The wire form 40 is preferably so proportioned and formed that when its legs 44 are inserted in the recess 30 in their limit position along the bottom wall 34, they will engage the outer ends of the grooves 48 and converge slightly therefrom towards the back wall 33. However, the head 22 of the cap screw 21 is so proportioned that when the screw 21 is tightened into the boss 25 until its head seats on the recess bottom wall 34, the head 22 will spread the ends of the arms 44 apart sufficiently to align them in substantially parallel relation with the side walls 35, and thereby will assure a snap or detent like type of locking action of the arms 44 in each of the pairs of grooves 47 and 48, which act as keepers for the arms.

In use when the bicycle is being ridden, the wire form 40 is releasably locked in its retracted position extending substantially parallel with the down tube 11 and with its legs 44 retained in the grooves 48, as shown in FIG. 1 and in broken lines in FIG. 2. When the bicycle is to be parked, the rider simply snaps the form 40 downwardly out of its retracted position, and either moves it manually to its operating position shown in FIG. 2, or moves it down far enough for engagement with the tire 16 and then rolls the bicycle backwards the few inches necessary for friction between the form 40 and tire 16 to carry the form to its operating position.

When the bicycle is again to be ridden, the brake is released by simply moving the bicycle forward, and thereby causing the tire 16 to carry the form 40 forward out of its locking position, after which it can be manually snapped into its retracted position.

As previously pointed out, the parking brake of the invention serves also as a stop and retainer for the cable sheaths 18. As best shown in FIGS. 6 and 8, the housing 20 is provided with a pair of through bores 55 located above and outwardly of the recess 30 which receive the cables 17 therethrough. These bores 55 have counterbores 56 at their forward ends which are proportioned to receive and retain the lower end portions of the cable sheaths 18, and which include lead-in tapered outer portions 57. As shown in FIG. 8, the counterbores 56 are of sufficient length that the ends of the sheaths will be retained therein throughout all normal movement of the cables and sheaths, and the inner end portions of these counterbores are preferably sized for a close clearance fit therein by the ends of the sheaths 18.

In the embodiment of the invention shown in FIG. 10, the housing 20 is modified to enable insertion of each cable 17 into the proper bore 55' without having to have the lower end of the cable free. The housing 20' is in every respect the same as housing 20 except that it is provided on each side with a slit 60 which extends the full length thereof and inwardly to the bore 55' and counterbore 56' and is of no greater width than the diameter of bore 55'. With this construction, each cable 17 and its sheath 18 can be set in place in the housing 20 by lifting the cable sufficiently for its sheath 18 to be above the housing 20', slipping the cable through the proper slot 60 into the adjacent bore 55', and then pushing the end of the sheath into the lead in portion 57' until it is seated at the bottom of the counterbore 56'.

While the product herein described constitutes preferred embodiments of the invention, it is to be understood that the invention is not limited to these precise products, and that changes may be made therein without departing from the scope of the invention which is defined in the appended claims.

What is claimed is:

1. In a bicycle having a frame including a down tube extending downwardly and rearwardly from a head tube wherein is journaled a fork holding a front wheel having a tire, the combination of a parking brake for releasably holding the front wheel in line with said frame, comprising:
   (a) a housing mounted on the underside of said down tube in close proximity with said front wheel tire,
   (b) said housing having a recess therein which is open at the front and along the underside of said housing,
   (c) said housing including a wall at the back of said recess which is substantially normal to the length of said down tube and a bottom wall extending substantially parallel with said down tube from said back wall to the front end of said housing,
   (d) said housing including side walls extending from said back wall toward the front end of said housing,
   (e) said housing having a pair of aligned holes in said side walls adjacent the corners of said recess formed by said side, back and bottom walls,
   (f) a generally U-shaped spring wire form having its center portion shaped to engage the front wheel tire and having also a pair of generally parallel leg portions received between said housing side walls,
   (g) said legs having oppositely outwardly turned end portions received in said holes in said side walls to form a pivotal mounting for said form in said recess,
   (h) each of said side walls having a groove therein extending from said hole therein adjacent the junction of said side wall with said rear wall and a second groove therein extending from said hole therein adjacent the junction of said side wall with said bottom wall,
   (i) said housing being mounted on said down tube by means including a screw extending through a hole in said bottom wall of said recess adjacent said back wall thereof and threaded into anchoring means on said down tube, and
   (j) said screw having a head received between said end portions of said wire form arms and proportioned to spread said end portions of said arms outwardly into substantially parallel relation and contact with the opposed surfaces of said side walls,
   (k) whereby said arms are releasably retained with a snap action within one or the other of said pairs of grooves when said wire form is moved to a position adjacent said back or bottom wall of said recess.

2. The combination defined in claim 1 wherein said anchoring means includes a boss on the underside of said down tube, and said housing has a recess in the upper surface thereof which is co-axial with said screw hole and fits over said boss.

3. In a bicycle having a frame including a down tube extending downwardly and rearwardly from a head tube wherein is journaled a fork holding a front wheel having a tire, and having also a pair of cables extending along the underside of said down tube for operating a gear changer on said bicycle, said cables having sheaths covering the upper portions thereof, the combination of a retainer for the lower ends of said sheaths and a parking brake for releasably holding the front wheel in line with the rest of said frame, comprising:
   (a) a housing mounted on the underside of said down tube in close proximity with said front wheel tire,
   (b) said housing having a recess therein which is open at the front and along the underside of said housing,
   (c) said housing having a pair of bores therethrough located above and outwardly of said recess which receive said cables therethrough,
   (d) said bores having counterbores at the forward ends thereof which receive and retain the lower ends of said cable sheaths respectively,
   (e) said housing including a wall at the back of said recess which is substantially normal to the length of said front tube and a bottom wall extending substantially parallel with said down tube from said back wall toward the front end of said housing,
   (f) said housing including side walls extending from said back wall toward the front end of said housing, (g) said housing having a pair of aligned holes in said side walls adjacent the corners of said recess formed by said side, back and bottom walls, (h) a generally U-shaped spring wire form having its center portion shaped to engage the front wheel tire and having also a pair of generally parallel leg portions received between said housing side walls, (i) said legs having oppositely outwardly turned end portions received in said holes in said side walls to form a pivotal mounting for said form in said recess, (j) each of said side walls having a groove therein extending from said hole therein adjacent the junction of said side wall with said rear wall and a second groove therein extending from said hole therein adjacent the junction of said side wall with said bottom wall, and (k) means spreading said end portions of said arms outwardly into substantially parallel relation and contact with the opposed surfaces of said side walls, (l) whereby said arms are releasably retained with a snap action within one or the other of said pairs of grooves when said wire form is moved to a position adjacent said back or bottom wall of said recess.

4. The combination defined in claim 3 wherein said housing is mounted on said down tube by means including a screw extending through a hole in said bottom wall of said recess adjacent said back wall thereof and threaded into anchoring means on said down tube, said screw having a head received between said end portions of said wire form arms and proportioned to spread said arms outwardly as defined in claim 4.

5. The combination defined in claim 3 wherein said housing has a slit in each side thereof extending the full length thereof and connecting with the adjacent said bore to provide for sidewise entry of said cables into said bores, each of said slits being of no greater width than the diameter of said bores, whereby said sheaths on said cables cannot pass therethrough but will be retained within said counterbores.

6. In a bicycle having a frame including a head tube, a down tube extending downwardly and rearwardly from said head tube, a fork journalled in said head tube, a front wheel rotatably mounted in said fork and including a tire, a pair of cables extending downwardly from said changer means along said down tube for operating a gear changer on said bicycle, said cables having sheaths covering the upper portions thereof, the combination of a retainer for the lower ends of said sheaths and a parking brake for releasably holding said front wheel in line with said frame, comprising:

(a) a housing mounted on the underside of said down tube in close proximity to said front wheel tire, (b) said housing having a pair of aligned holes in the side walls thereof extending at right angles to said down tube, (c) said housing having a pair of bores extending therethrough substantially parallel with said down tube for receiving said cables therethrough, (d) said bores having counterbores at the forward ends thereof for receiving and retaining said lower ends of said cable sheaths respectively, (e) a generally U-shaped spring wire form having a center portion shaped to engage said front wheel tire and having also a pair of generally parallel leg portions, (f) said legs having end portions oppositely turned at right angles to said legs and received in said holes in said side walls to form a pivotal mounting for said form in said housing, (g) recess defining means in said housing adjacent the end of each of said aligned holes entered by one of said leg end portions and including wall portions limiting pivotal movement of sadi legs between a retracted limit position substantially parallel with said down tube and an advanced position substantially perpendicular with said down tube wherein said form is in holding engagement with said front wheel tire, (h) whereby forward movement of said tire will move said form from said advanced position toward said retracted position, and (i) detent means for releasably retaining said form in said retracted position.

* * * * *